Figure 3:
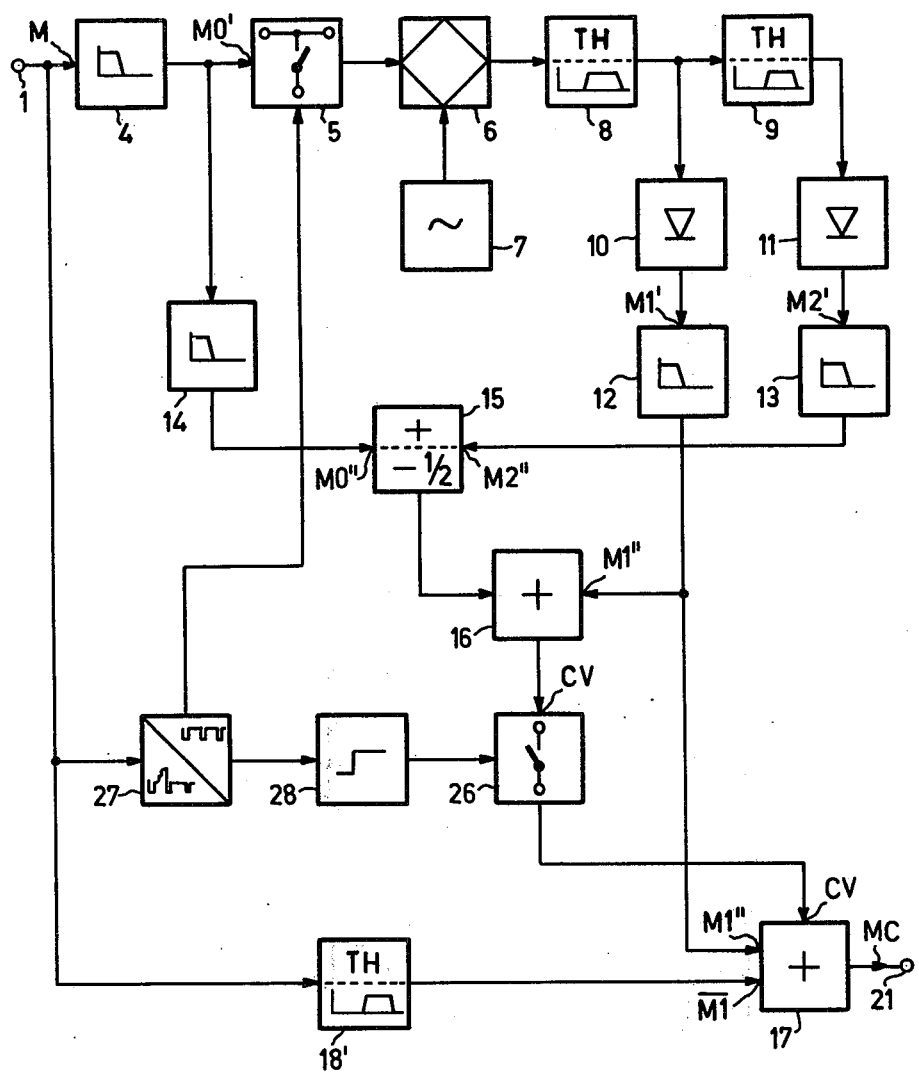

United States Patent [19]
Hofman et al.

[11] 3,952,327
[45] Apr. 20, 1976

[54] APERTURE CORRECTION CIRCUIT FOR TELEVISION

[75] Inventors: Jan August Marcel Hofman; Sing Liong Tan, both of Eindhoven, Netherlands

[73] Assignee: U.S. Philips Corporation, New York, N.Y.

[22] Filed: Sept. 27, 1974

[21] Appl. No.: 509,802

[30] Foreign Application Priority Data
Oct. 6, 1973  Netherlands....................... 7313754

[52] U.S. Cl............................. 358/37; 178/DIG. 25
[51] Int. Cl.²........................................... H04N 9/14
[58] Field of Search............... 358/37; 178/DIG. 25, 178/7.1

[56] References Cited
UNITED STATES PATENTS

| | | | |
|---|---|---|---|
| 3,030,440 | 4/1962 | Schade, Sr. .................. | 178/DIG. 25 |
| 3,732,360 | 5/1973 | Breimer et al. ........................ | 358/37 |

OTHER PUBLICATIONS

McMann, "Improved Signal Processing Techniques for Color Television Broadcasting," *Journal of SMPTE*, Vol. 77, Mar. 1968, pp. 221–228.

Gibson, "A Vertical Aperture Equalizer for Television," *Journal of SMPTE*, Vol. 69, June 1960, pp. 395–401.

Capers, "Camera Engineering – The Mark VIII Camera Channel Design of the Video Circuits," *Sound & Vision Broadcast*, (G.B.), Vol. 12, No. 1 (Spring 1971), pp. 24–30.

*Primary Examiner*—Robert L. Richardson
*Attorney, Agent, or Firm*—Frank R. Trifari; Henry I. Steckler

[57] ABSTRACT

A vertical aperture correction circuit for television in which two cheap narrow-band delay circuits are used for giving a line period delay by means of signal modulation. High-frequency video information is applied through a highpass filter to an adder stage to which furthermore the low-frequency video information delayed over one line period and the aperture correction signal are applied. The highpass filter may be formed with a third narrow-band delay circuit as a bandpass filter.

10 Claims, 3 Drawing Figures

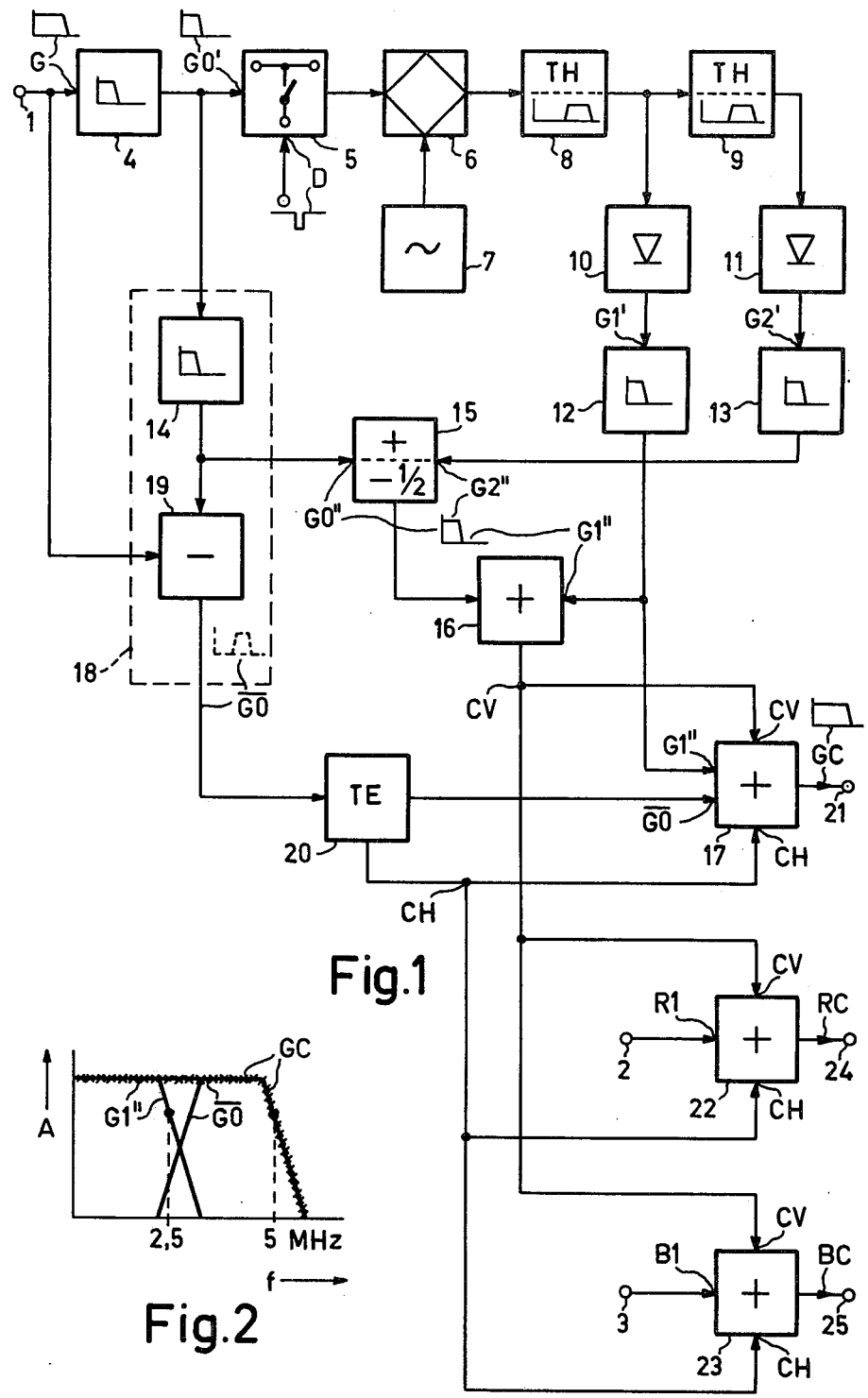

APERTURE CORRECTION CIRCUIT FOR TELEVISION

The invention relates to an aperture correction circuit for television for improving the definition in the field scan direction, comprising two delay circuits having a determined bandwidth which give a television picture signal occurring at an input of the circuit a television line period delay through signal modulation and demodulation, and signal combining circuits for forming from the undelayed signal, the signal delayed once and the signal delayed twice over one line period an aperture correction signal to be applied to a first input of an adder stage whose second input receives the signal delayed over one line period so that an aperture-corrected signal occurs at an output.

Such a circuit is described in U.S. Pat. No. 2,971,053. This Specification states that the use of the second expensive delay circuits with a passband suitable for the transmission of the entire picture or video signal bandwidth (from zero to four MHz) may be considered as a drawback. To obviate the expensive solution it has been proposed to provide only one delay circuit and to feed its output signal back to the input. The specification states that signal-disturbing acoustic feedback effects may occur so that the signal feedback may only be effected to a limited extent. To improve this a circuit has been proposed which is again provided with two delay circuits having their own signal feedback thus reduced in half. In this case not only the video signal information of a preceding and a subsequent line is utilized for the aperture correction, but a plurality of preceding and subsequent lines. It is found from the said patent Specification that the proposed solution does not lead to a much less expensive embodiment.

The invention has for its object to realize a simple and cheap aperture correction circuit with which a satisfactory improvement of the definition upon display of the aperture-corrected picture signal is obtained without signal perturbations. The aperture correction circuit according to the invention is to this end characterized in that the circuit is formed with a highpass filter having an input for the supply of the signal which is not delayed over one line period and an output which is connected to a third input of the said adder stage, the bandwidth of the highpass filter being mainly located above the bandwidth of the signals occurring after the delay circuits with a limited bandwidth.

One embodiment of an aperture correction circuit according to the invention is furthermore characterized in that the sum of the bandwidth of the signal occurring after one of the delay circuits and of the signal occurring after the highpass filter results in an essentially flatly varying amplitude-versus frequency characteristic in the summed bandwidth range.

The invention is based on the recognition of the fact that cheap delay circuits having a passband which is limited relative to the picture signal bandwidth can be used for the aperture correction signal derivation by passing the signal components of a comparatively high frequency in the picture signal to the output of the aperture correction circuit via the highpass filter while bypassing the delay circuits. For the purpose of illustration a picture signal bandwidth of 5 MHz may be mentioned in which the delay circuits only have a passband of 2 MHz while the passband of the highpass filter starts at 3 MHz.

The invention will be described in greater detail with reference to the following Figures as examples in which FIG. 1 shows a first embodiment of an aperture correction circuit according to the invention;

FIG. 2 illustrates the principle of the invention by means of a signal amplitude-versus-frequency characteristic and FIG. 3 shows a second embodiment.

The aperture correction circuit of FIG. 1 has an input 1 to which a signal G is applied. The signal G is a picture signal occurring in television which comprises the video information on a scene picked up. To this end a potential image is formed in a pick-up device formed for example as a camera tube, which image corresponds to the scene and which is converted into a picture signal through electron beam scanning effected line by line and field by field. Due to a decrease in definition in the potential image compared with the scene and the finite diameter of the electron beam upon scanning, the definition upon display of a scene picked up is decreased. To improve the definition in the field scan direction, which normally corresponds to the vertical direction, a vertical aperture correction is generally used. A definition improvement in the line scan or horizontal direction is given by a horizontal aperture correction. The circuit of FIG. 1 is essentially intended for the vertical aperture correction in which, however, also a horizontal aperture correction can be used. Furthermore there applies that the definition improvement is equally desirable when using a pick-up panel as a pick-up device where discrete points and lines can be indicated for generating the picture signal.

The circuit of FIG. 1 is shown as being intended for colour television in which normally three colour picture signals occur which correspond to a green (G), a red (R) and a blue (B) light component in the scene. In FIG. 1 the reference numerals 2 and 3 denote inputs to which a red colour picture signal R1 and a blue colour picture signal B1 are applied. Since the circuit of FIG. 1 is equally suitable for monochrome television having only one picture signal, only the signal G will be described in the first instance for the purpose of explaining the invention.

In FIG. 1 a signal amplitude-versus-frequency characteristic is shown at the signal G. A comparison with FIG. 2 illustrating a different signal amplitude-versus-frequency characteristic shows that an amplitude A is plotted against a frequency $f$. For the signal G of FIG. 1 there applies for the purpose of illustration that it occurs with a bandwidth of from 0 to for example 5 MHz which value occurs at the $-3dB$ point. Other bandwidths will be indicated in the same manner. Generally the signal G is utilized with the full bandwidth up to 5 MHz in aperture correction circuits for deriving an aperture correction signal for the field scan direction. Expensive delay circuits having a passband of 5 MHz are used in known manner for this purpose. In contrast therewith the signal G of FIG. 1 for generating the aperture correction signal is firstly applied from the input 1 to a lowpass filter 4 so that a signal G0' occurs at its output with a limited bandwidth shown at this output of from 0 to, for example, 3 MHz.

The signal G0' is applied through a clamping circuit 5 to a modulator 6 to which furthermore a carrier having a frequency of, for example, 6.2 MHz is applied from an oscillator 7. A signal D with clamping pulses is applied to the clamping circuit 5, which pulses give a reference level (black level) in the picture signal as they occur during part of the so-called line blanking time when there is no picture information of the scene in the signal G or G0'. During the remaining part of a line period (the line scan time) the picture or video information is present. Two series-arranged delay circuits 8 and 9 follow the modulator 6. The delay circuits 8 and 9 have a bandpass filter characteristic in which signals occurring in the passband of the filter of, for example, 4 to 6 MHz undergo a time delay TH of the same magnitude as the said line period By modulation of the carrier originating from oscillator 7 the signal G0' occurs in the passband of the circuits 8 and 9 so that signals G1' and G2' are produced through subsequent demodulators 10 and 11, which signals are delayed once and twice over the line period TH, respectively. The demodulators 10 and 11 are followed by low-pass filters 12 and 13 through which signals G1'' and G2'' result. For obtaining an aperture correction signal it is required to have also a signal available which is not delayed over one line period to which end the signal G0' in FIG. 1 produces a signal G0'' through a lowpass filter 14. The signals G0'', G1'' and G2'' (jointly G'') approximately have the same amplitude-versus-frequency characteristic as shown in FIG. 1 by using the filters 14, 12 and 13, with the same delay times while the signal-to-noise ratios are improved. The filters 12 and 13 block the said carrier and compensate for the different filter characteristics of one delay circuit (8) and of the two delay circuits (8 and 9) in series. For the purpose of illustration there applies that when using the filters 12 and 13 with a bandwidth of up to approximately 3 MHz the filter 14 in a circuit has a bandwidth of up to 2.5 MHz while the signals G0'', G1'' and G2'' have a bandwidth of up to 2.5 MHz. The filter 4 has the said bandwidth of 3 MHz and with its frequency limitation it is to prevent unwanted interfering modulation products from being produced between higher signal frequencies and the carrier frequency. In the choice of a carrier frequency located far above the highest video frequency the filter 4 might be absent when using the narrow-band delay circuits 8 and 9.

The signals G0'' and G2'' are applied to a stage 15 which adds these signals and inverts the sum signal in its phase and reduces it by 50%. The output of the stage 15 is connected to an input of an adder stage 16 whose other input receives the signal G1'' so that a signal $CV = G1'' - \frac{1}{2}(G0'' + G2'')$ occurs at its output. The signal CV thus formed by signal combining circuits (15 and 16) is the vertical aperture correction signal which, as is known, is to be zero for equal instantaneous signal values for three superposed lines which is guaranteed by using the filters 12, 13 and 14 providing the signals G1'', G2'' and G0'' with the same amplitude-versus-frequency characteristic so that influence emanating from the different signal paths are eliminated.

For performing the vertical aperture correction the correction signal CV is applied to a first input of an adder stage 17 a second input of which receives the signal G1''. Without further steps the adder stage 17 would supply a sum signal G1'' + CV with a bandwidth up to only 2.5 MHz (G1''). The limited bandwidth of the signal G1'' would yield an unacceptable picture upon display due to the poor definition in the horizontal direction, even with an improvement of the definition in the vertical direction (CV).

According to the invention the circuit of FIG. 1 is therefore provided with a highpass filter 18 which is constituted by the lowpass filter 14 and a subtractor stage 19 connected thereto while another input of the stage is connected to the input 1. A signal $\overline{G0} = G - G0''$ occurs at the output of the subtractor stage 19. The amplitude-versus-frequency characteristic of the signal $\overline{G0}$ is shown in FIGS. 1 and 2. The edge located at a lower frequency of the pass region of the filter 18 is given by the filter 14 while the edge located at a higher frequency is determined by the signal G itself. The filter 18 is therefore essentially a highpass filter with a bandpass filter characteristic (shown) being present at the output. The filter 18 is connected to an input of a horizontal aperture correction signal shaper 20. In the correction signal shaper 20, for example, two delay circuits and signal combining circuits are present which can be compared with the components 8, 9, 15 and 16. In this case the delay circuits have a delay time TE of, for example, 125 ns. The correction signal shaper 20 thus provides a horizontal aperture correction signal CH and the signal $\overline{G0}$ which relative to the signal $\overline{G0}$ applied thereto is delayed over the delay time TE. For the sake of simplicity no other notation has been introduced for the signal delayed over the time TE and supplied by the correction signal shaper 20 because this small delay is irrelevant to the invention. Instead of the correction signal shaper 20 following the filter 18 a correction signal shaper might precede it. When a horizontal aperture correction is not appreciated, the correction signal shaper 20 may be omitted.

The correction signal shaper 20 applies the passed signal $\overline{G0}$ which is, however, delayed over the time TE to a third input of the adder stage 17 and applies the horizontal aperture correction signal CH to a fourth input. The adder stage 17 thus applies to an output 21 of the circuit a signal $GC = G1'' + \overline{G0} + CV + CH$ which as compared with the signal G is an aperture-corrected signal having the same bandwidth.

FIG. 2 shows the amplitude-versus-frequency characteristic of the signal GC as it is formed from the characteristics of the signals G1'' and $\overline{G0}$. Here there applies for an optimum composed characteristic of the signal GC that it must vary flatly over the summed bandwidth region which variation has been taken as a starting point for the signal G. A variation which is not flat at the transition of the bandwidth region of the signals G1'' to that of the signal $\overline{G0}$ may lead to an unwanted weakening or strengthening of certain frequency components in the composite signal GC. For the sake of simplicity of the amplitude-versus-frequency characteristics the emphasized lower or higher signal components obtained by the vertical or horizontal aperture correction are left out of consideration.

It is found that the composite signal GC is built up of the low frequency information of a line (G1'') and the high frequency information of a preceding line ($\overline{G0}$). In practice it is found that this, together with the vertical aperture correction (CV) performed is not noticeable in a displayed scene. The aperture-corrected composite signal GC seems to be derived upon display in one of the known manners from the signal G by means of expensive delay circuits with a passband of 5 MHz. In contrast thereto only cheap delay circuits 8 and 9 having a passband of 2 MHz are used.

The circuit of FIG. 1 is given for use in a colour television system and is therefore formed with another two adder stages 22 and 23 which are connected to the inputs 2 and 3, respectively, of the circuit. By applying the vertical aperture correction signal CV formed in the described manner according to the invention to the adder stage 22 and, if desired, the horizontal aperture correction signal CH, the adder stage 22 applies an aperture-corrected signal RC to an output 24 of the circuit. The signal R1 applied to the adder stage 22 corresponds to a signal G1 of the full bandwidth, that is to say, with a signal R which is delayed over once a line period TH. This signal R1 is not obtained through a delay circuit, but is directly supplied by a pick-up device because it provides the information of the subsequent line as reckoned relative to the scanned line in the pick-up device generating the picture signal G.

Likewise the adder stage 23 applies an aperture-corrected signal BC, under the supply of the signal B1, to an output 25 of the circuit of FIG. 1.

When in the colour television system a so-called luminance signal comprising the colour signals G, R and B in a combination is directly generated by a pick-up tube or panel, the vertical and/or horizontal aperture correction signal is derived from this signal.

The circuit of FIG. 1 may be followed by gamma correction circuits, matrix circuits, filter circuits, coding and modulating circuits, etc. in a colour television camera.

FIG. 3 shows an aperture correction circuit provided with the reference numerals for the components shown in FIG. 1 with or without indices for emphasizing a modification. A signal M is applied to the input 1 of the circuit according to FIG. 3 in which it is an essential fact that there are equalising and field synchronizing pulses. The signal M is, for example, a picture signal combined with a composite synchronizing signal which together yield a video signal. The composite synchronizing signal comprises line synchronizing pulses and pre-equalizing as well as post-equalizing pulses flanking the field synchronizing pulses. Apart from the synchronizing signal the signal M may be equal as regards the picture contents to the signal G of FIG. 1. Furthermore the signal M in colour television may be a composite colour luminance signal which is formed from a broadband luminance signal, two quadrature carrier-modulated narrow-band colour difference signals and bursts of a colour burst signal and also in this case the synchronizing signal is present.

In the circuit according to FIG. 3 the components 4 to 16 apply the vertical aperture correction signal CV to the first input of the adder stage 17 through a gating circuit 26 to be described hereinafter, while the signal M1'' is applied to the second input. Instead of the highpass filter 18 of FIG. 1 a bandpass filter 18' is used in FIG. 3 between the input 1 and the third input of the adder stage 17. The filter 18' is identical to the delay circuits 8 and 9 so that only a signal band located at a high frequency is obtained from the signal M with the full bandwidth. In this case the passed signal band undergoes a delay TH which is equal to the line period so that the filter 18' provides a signal $\overline{M1}$. Consequently an aperture-corrected signal $MC = M1'' + \overline{M1} + CV$ occurs at the output 21. As regards the shape of the amplitude-versus-frequency characteristic the signal MC is equal to that shown in FIG. 2 for the signal GC. One difference is that due to the use of the filter 18' with the delay time TH the signal $\overline{M1}$ delayed once over a line period is present in the adder stage 17 instead of the signal $\overline{GO}$ not delayed over one line period. Instead of the filter 18 shown the filter 18' might be used in the circuit according to FIG. 1 which would yield a signal $\overline{G1}$ for the adder stage 17. The use of the three identical circuits 8, 9 and 18' two of which act as delay circuits (8 and 9) and one of which acts as a bandpass filter (18') is still many times cheaper than two delay circuits having a passband over the entire video signal range.

The presence of the equalizing and field synchronizing pulses in the signal M would yield an erroneous aperture correction signal CV in the signal MC without further steps. In fact, due to the delay of once and twice over one line period line synchronizing pulses will occur in a signal simultaneously with pre- and post-equalizing pulses in another signal, while the latter will in turn simultaneously occur with field synchronizing pulses. The result is that short-lasting pulses will occur in the signal CV due to the combination of equalizing and line synchronizing pulses and long-lasting pulses will occur in the signal CV due to the combination of equalizing and field synchronizing pulses where this should not be the case. Only in case of the line synchronizing pulses the three of them are always present so that the signal CV is not influenced. The described interference in the correction signal CV does not occur in the signal MC by blocking during their occurrence the gating circuit 26. Blocking is effected at least during the number of line periods in which the pre- and post-equalizing pulses and the field synchronizing pulses occur plus two line periods. For performing the blocking action the signal M at the input 1 is applied to a pulse separator 27 which separates the line synchronizing, equalizing and field synchronizing pulses from the modulated or unmodulated video signal M. The pulse separator 27 is connected to a gating signal generator 28 an output of which is connected to the gating circuit 26. Furthermore an output of the pulse separator 27 is connected to the clamping pulse input of the clamping circuit 5. When the modulated composite colour luminance signal M is applied to the input 1, the pulse separator 27 provides clamping pulses which occur during the line synchronizing pulse times. In fact, due to the presence of a burst in the colour burst signal on the so-called back porch the clamping pulses may not act thereon. However, since the composite colour luminance signal has a standardized peak-to-peak value between the synchronizing pulse level and the peak white value in the picture contents, the determined synchronizing pulse level may be utilized for determining the black level.

In FIG. 3 the filter 18 of FIG. 1 may as well be used instead of filter 18'.

When the signal M with the broadband luminance signal and the narrow-band colour difference signals modulated in quadrature on a carrier is applied to the input 1 of the circuit according to FIG. 3, the bandwidth of the lowpass filter 4 may be chosen, if desired, in such a manner that no or little information of the carrier modulated with the colour difference signals occurs in the signal MO'. The aperture-correction signal CV is then only derived from the low frequency part of the luminance information. In case of a sufficiently low band of the lowpass filter 4 the frequency of the oscillator 7 might be chosen to be equal to that of the chrominance subcarrier.

What is claimed is:

1. A method for aperture correcting a video signal having a given bandwidth, said method comprising generating an aperture correction signal from said video signal by using delay lines having a bandwidth substantially less than said given bandwidth, filtering said video signal with a lower cut off frequency about equal to the bandwidth of said delay lines to produce a filtered signal, and adding said correction and filtered signals to produce an aperture corrected video signal.

2. An aperture correction circuit comprising input means for receiving a video signal having a given bandwidth, circuit means coupled to said input means for generating an aperture correction video signal having delay circuits with a bandwidth substantially less than said given bandwidth, filter means coupled to said input means and having a lower cut off frequency about equal to the bandwidth of said delay circuits, and first adder stage means coupled to said filter means and said generating means to produce an aperture corrected video signal.

3. An aperture correction circuit as claimed in claim 2, wherein the cut off frequency of the filter means is slightly higher than the bandwidth of the delay circuits, whereby the sum of the bandwidth of the signal occurring after one of the delay circuits and of the signal occurring after the filter means results in an essentially flatly varying amplitude-versus-frequency characteristic in the summed bandwidth range.

4. An aperture correction circuit as claimed in claim 2, wherein the delay circuits and the filter means are identical.

5. An aperture correction circuit as claimed in claim 2, wherein the filter means comprises a subtractor stage having a first input coupled to the input means at which the signal occurs with the full bandwidth and a second input, and a lowpass filter having an input coupled to the input means and an output coupled to the second input of the subtractor stage.

6. An aperture correction circuit as claimed in claim 2, further comprising a lowpass filter coupled to said input means, a signal modulator coupled between said input means and said delay circuits, a carrier oscillator coupled to said modulator, and signal demodulators coupled to said delay circuits respectively, the carrier frequency being located above the lowpass filter characteristic.

7. An aperture correction circuit as claimed in claim 2, further comprising an aperture-correction signal shaper means for improving the definition in the line scan direction coupled in series with the filter means between the input means and the adder stage.

8. An aperture correction circuit as claimed in claim 2 wherein said video signal comprises equalizing and field synchronizing pulses and, further comprising signal combining circuits coupled to said delay circuits, a gating circuit coupled between the said signal combining circuits and the adder stage, a gating signal generator means coupled to said gating circuit for providing a gating signal blocking the gating circuit during at least the equalizing and field synchronizing pulse times in the undelayed and delayed picture signals.

9. An aperture correction circuit as claimed in claim 8, wherein the signal present at the input of the circuit 8 is a carrier-modulated signal for colour television.

10. An aperture correction circuit as claimed in claim 2, wherein said video signal comprises a plurality of colour picture signals, and further comprising at least second and third adder stages each having two inputs, the said aperture correction signal being applied to a first input and a respective colour picture signal with the full bandwidth being applied to the second input of each of said second and third adder stages respectively.

* * * * *